Sept. 6, 1927.  G. W. MATTSON  1,641,822
WIRE TWISTING AND CUTTING TOOL
Filed Aug. 15, 1924   2 Sheets-Sheet 2
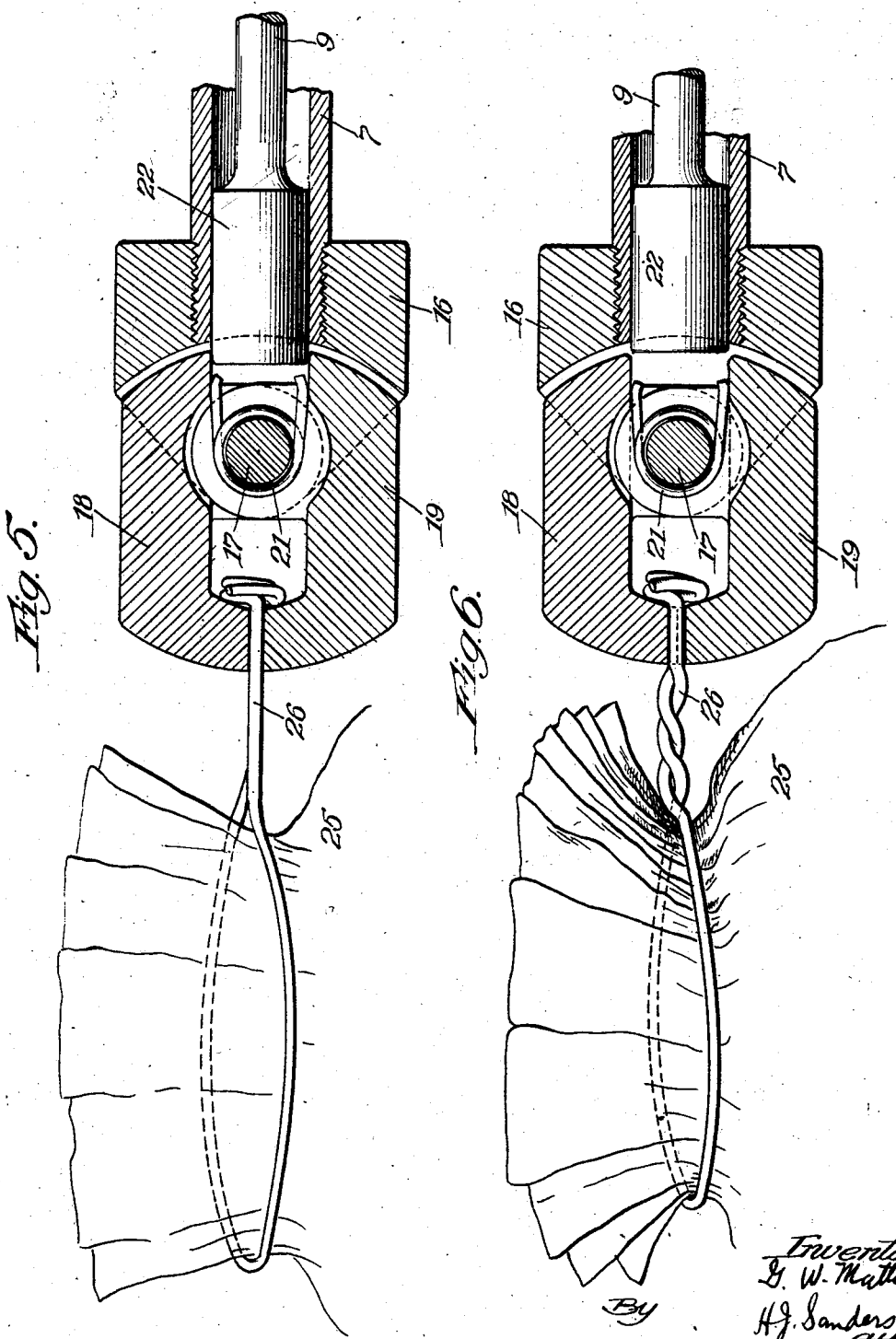

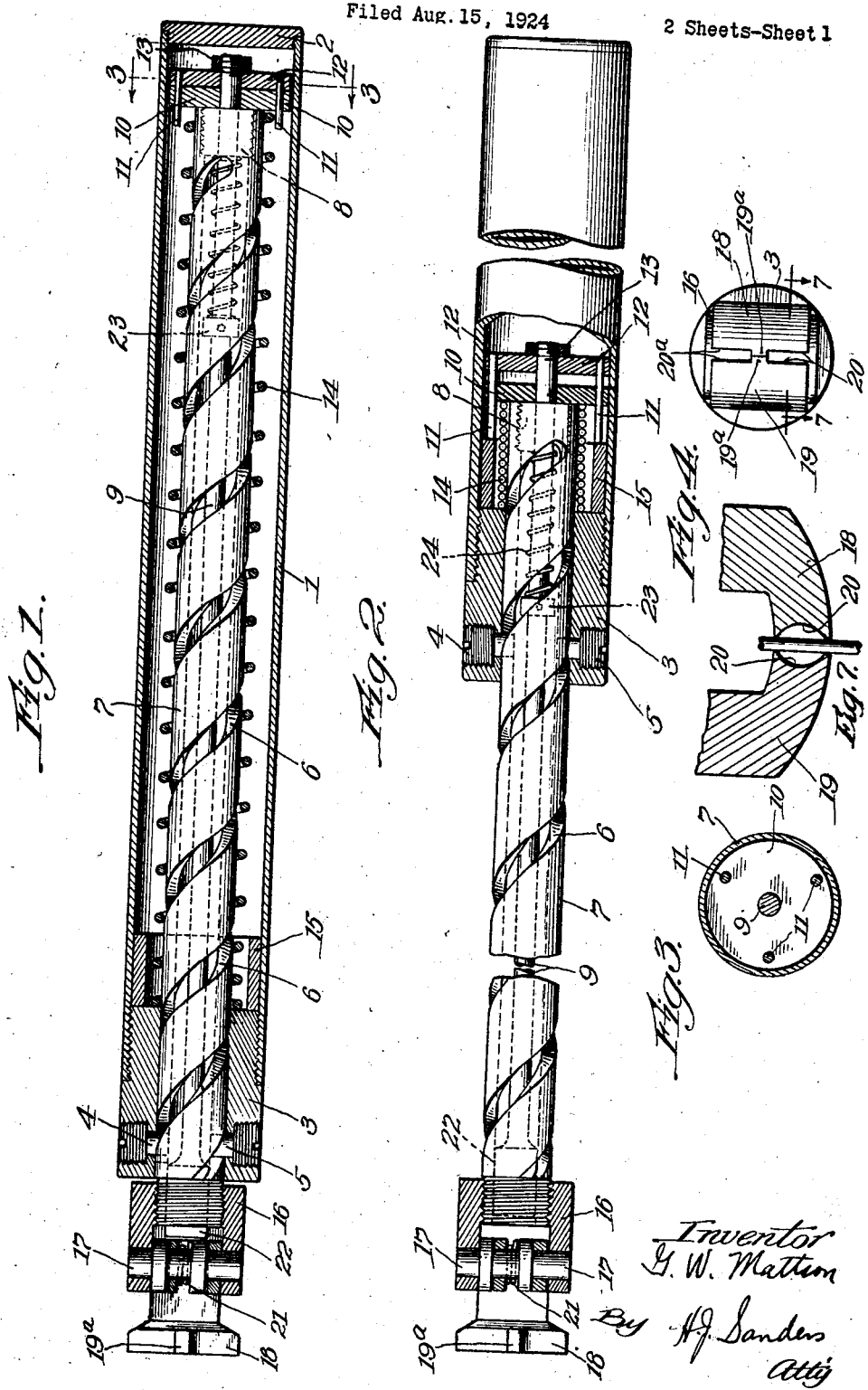

Patented Sept. 6, 1927.

1,641,822

UNITED STATES PATENT OFFICE.

GUSTAVE W. MATTSON, OF CHICAGO, ILLINOIS.

WIRE TWISTING AND CUTTING TOOL.

Application filed August 15, 1924. Serial No. 732,245.

This invention relates to improvements in wire twisting and cutting tools and its object primarily is to provide a tool for twisting, or twisting and cutting, a wire looped about the mouth of a sack, bag or the like to tie the same shut. Simplicity in construction, cheapness of manufacture, and efficiency in operation are objects attained by the present device.

With the foregoing and other objects in view the invention consists in the combination and arrangement of parts to be hereinafter fully described, pointed out in the appended claims, and illustrated in the accompanying drawing which forms a part of this application and in which—

Fig. 1 is a longitudinal sectional view through the tool;

Fig. 2 is a similar view with the movable parts in an altered position;

Fig. 3 is a cross-section taken on line 3—3 of Fig. 1;

Fig. 4 is a view of the tool in end elevation;

Fig. 5 is a fragmentary view of the tool, enlarged, in section illustrating its application, the wire being shown in the twisting side of the jaws preliminary to the twisting operation;

Fig. 6 is a view similar to Fig. 5 but showing the tool after the twisting operation has been performed; and Fig. 7 is a section, enlarged, on line 7—7 of Fig. 4 showing the application of the cutting jaws.

Like reference characters denote corresponding parts throughout the several views.

The reference numeral 1 denotes the hollow cylindrical body, or handle, of the tool which is closed at one end by the plug 2, the opposite end being threaded to receive the sleeve-like head 3 that carries the oppositely disposed screw guides 4, 5 the ends of which extend inwardly and are disposed in the spiral slots 6, two in number, formed in the hollow rotary shaft 7 in one end of which the burr 8 is arranged through the perforation in which the longitudinally extending rod 9 extends that at one end extends beyond the rotary shaft 7 and through the disk 10 integral with said burr 8 and that abuts one end of the said shaft 7, said disk being perforated for sliding engagement with the pins 11 carried by the pin disk 12 arranged upon one end of the rod 9 and retained in position by the nut 13. An expansion coil spring 14 encompasses the shaft 7 and is designed to abut the head 3 at one end and the disk 10 at the other, a stop collar 15 within the body 1 encompasses the shaft 7 and spring 14 and abuts the head 3 and is adapted for impact by the said pins 11.

The outer end of the shaft 7 is threaded exteriorly to receive the chuck 16 provided with the cross-pin 17 upon which the jaws 18, 19 are arranged each of which is formed with the oppositely disposed jaw projections 19ª which contact when the jaws come together. Upon both sides of the projections 19ª the jaws are spaced apart, even in closed position, as shown in Fig. 4 to afford clearance for insertion of the wire strands to be twisted or cut. The jaws 18, 19 upon one side of the projections are formed with cutting edges 20 while upon the opposite side the jaw edges 20ª are dulled to permit twisting without cutting the wire. The jaws are yieldingly closed by the spring 21 wound about the said pin 17, the ends of said spring yieldingly pressing the butt ends of the jaws apart. Referring again to the rod 9 the same terminates at one end in the head 22, round in cross-section, and adapted when the jaws 18, 19 are closed for disposal between their inner or butt ends to retain them positively in this position. A collar 23 fast upon the said rod 9 is engaged by one end of the small expansion coil spring 24 that encircles the said rod 9 and abuts the burr 8, said spring serving yieldingly to urge the rod toward the jaws.

The bag 25 is to be closed by the wire tie 26. The ends of the tie are placed between the jaws 18, 19. If the wire tie is only to be twisted it is inserted between the dulled jaw edges. After it is twisted it may be cut by then inserting the wire between the sharpened edges of the jaws. In twisting the wire after it is placed between the dulled jaw edges the operator draws the body or handle 1 of the tool in a direction away from the bag thus withdrawing and rotating the shaft 7 and connections, the rotation being accomplished by the opposed screw guides 4, 5 disposed in the spiral slots 6, compressing the spring 14 and disposing the head 22 between the inner ends of the jaws thus positively retaining the outer, or wire engaging, ends of said jaws closed. The rotation of the jaws with the chuck and shaft twists the wire 26 tightly and in effect seals it, causing it to tightly close the mouth of the bag 25. When the tool assumes the position shown in Fig. 2 the pins 11 have forcibly struck the collar 15, this action instantly retracts the rod 9 and withdraws the head 22 from between the jaws 18, 19; the ends of the twisted wire will then be jerked from between the jaws and the tool is freed for the next tieing operation or for the cutting operation. To cut the wire after it is twisted the operator re-inserts it in the jaws, this time between the sharpened edges and again draws the handle 1 away from the bag which rotates the jaws which are gripping the wire, as shown in Fig. 7, the twisting movement of the sharp jaws causing them to so tightly impinge upon the wire strands as to cut them in twain. To twist and cut the wire at one operation it is, in the first place, disposed between the sharp edges 20 and the tool operated as described. The wire strands will be given approximately three twists before they are finally severed by the twisting movement of the jaws. The handle 1 with plug 2 and head 3 form a housing which keeps the parts of the tool free from dust and dirt and makes it unnecessary to oil the tool. This feature eliminates the greatest objection to tools of this type and makes them practical and durable.

What is claimed is:—

1. In a wire twisting and cutting tool, a cylindrical body portion, a head therefor, a stop collar within said body abutting said head, a spirally slotted shaft extending longitudinally of said members, a spring-pressed rod extending through said shaft, a pin disk at one end of said rod, pins carried by said pin disk for forcible contact with said stop collar, a base disk for said shaft slidable upon the pins of said pin disk, screw-guides carried by said head and disposed in the slots of said shaft, a chuck carried by said shaft, gripping jaws carried by said chuck, and a spring within said chuck for yieldingly retaining said jaws in closed position.

2. In a wire twisting and cutting tool, a housing open at one end, a head in the open end of said housing, a shaft associated with said housing and normally disposed entirely therewithin and movable longitudinally thereof, means connecting said shaft and head whereby a rotary movement of said shaft is effected simultaneously with any longitudinal movement thereof, means connecting said head and shaft whereby the longitudinal movement of the latter is terminated abruptly at a predetermined point within said housing, said means comprising a headed rod, and gripping jaws carried by said shaft and in their closed position receiving one end of said headed rod.

In testimony that I claim the foregoing as my own I have hereto affixed my signature.

GUSTAVE W. MATTSON.